US012433201B2

United States Patent
Brocke et al.

(10) Patent No.: US 12,433,201 B2
(45) Date of Patent: Oct. 7, 2025

(54) METHOD FOR ASSISTING A DISTRIBUTION PROCESS BY MEANS OF A DISTRIBUTION TOOL ON A UTILITY VEHICLE

(71) Applicant: DEERE & COMPANY, Moline, IL (US)

(72) Inventors: Stefan Brocke, Mannheim (DE); Danesh Gandhi, Pune (IN)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/911,666

(22) Filed: Oct. 10, 2024

(65) Prior Publication Data
US 2025/0134005 A1    May 1, 2025

(30) Foreign Application Priority Data
Oct. 27, 2023   (DE) .......................... 102023129673.6

(51) Int. Cl.
*A01F 25/00*    (2006.01)
*A01F 25/18*    (2006.01)

(52) U.S. Cl.
CPC .......... *A01F 25/186* (2013.01); *A01F 25/183* (2013.01)

(58) Field of Classification Search
CPC .... A01F 25/186; A01F 25/183; A01F 25/166; A01F 25/16; A01D 90/12; A01C 21/00; A01C 21/007; A01G 25/16; A01G 1/00
USPC ......................................... 53/257; 172/1, 2
See application file for complete search history.

(56) References Cited

U.S. PATENT DOCUMENTS

| 11,247,426 | B2 | 2/2022 | Kraus | |
|---|---|---|---|---|
| 2007/0005306 | A1* | 1/2007 | Foessel | G01S 13/723 |
| | | | | 702/189 |
| 2012/0318539 | A1* | 12/2012 | Joergensen | E02F 3/847 |
| | | | | 172/1 |
| 2019/0126308 | A1* | 5/2019 | Hendrickson | B05B 1/20 |
| 2019/0128864 | A1* | 5/2019 | Pickett | A01M 7/0089 |
| 2020/0063399 | A1* | 2/2020 | Miller | E02F 9/265 |
| 2021/0321571 | A1 | 10/2021 | Brocke et al. | |
| 2021/0329844 | A1 | 10/2021 | Brocke et al. | |

(Continued)

FOREIGN PATENT DOCUMENTS

| DE | 102017208558 A1 | 11/2018 |
|---|---|---|
| DE | 102020206120 A1 | 10/2021 |
| EP | 3895521 A1 | 10/2021 |

OTHER PUBLICATIONS

Extended European Search Report and Written Opinion issued in European Patent Application No. 24196123.4 dated Feb. 27, 2025, in 10 pages.

*Primary Examiner* — Jacob A Smith

(57) ABSTRACT

A method for assisting a distribution process by a distribution tool attached to a utility vehicle includes adjusting a position of a lower edge of the distribution tool by changing a lifting position of the distribution tool, determining by a sensor attached to the distribution tool a first distance between the lower edge and a surface region of the material being distributed, utilizing the first distance as a basis for adjusting the lifting position when the first distance has a value greater than or equal to zero, estimating a second distance from the lower edge of the distribution tool to the surface region based on the position of the lower edge resulting from the lifting position, and utilizing the second distance for adjusting the lifting position when the first distance has a value of less than zero.

8 Claims, 3 Drawing Sheets

(56) References Cited

U.S. PATENT DOCUMENTS

2022/0039318 A1* 2/2022 Raste .................. A01D 43/087
2022/0146391 A1   5/2022 Von Holst et al.

* cited by examiner

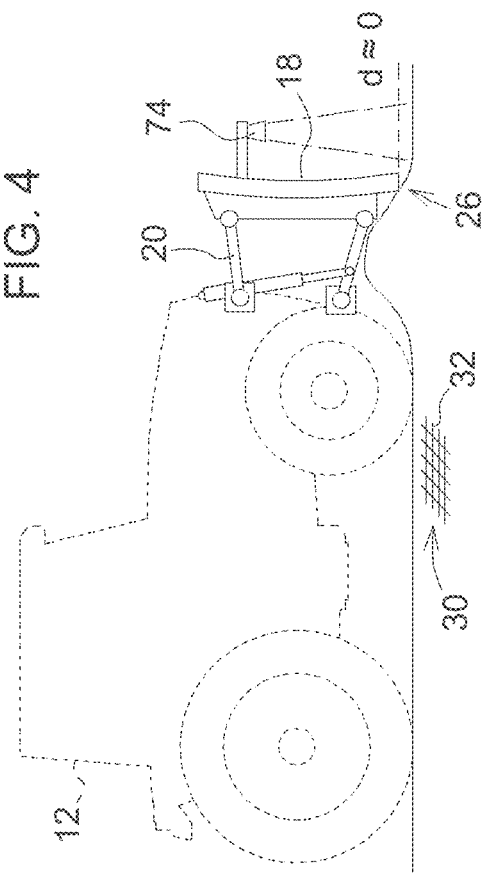
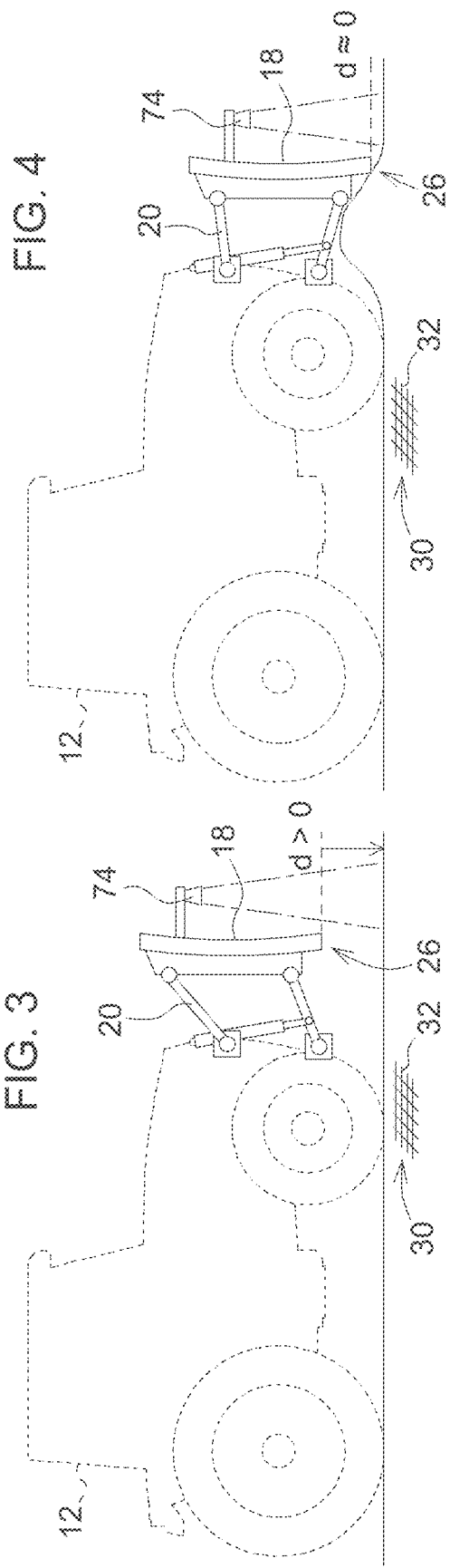
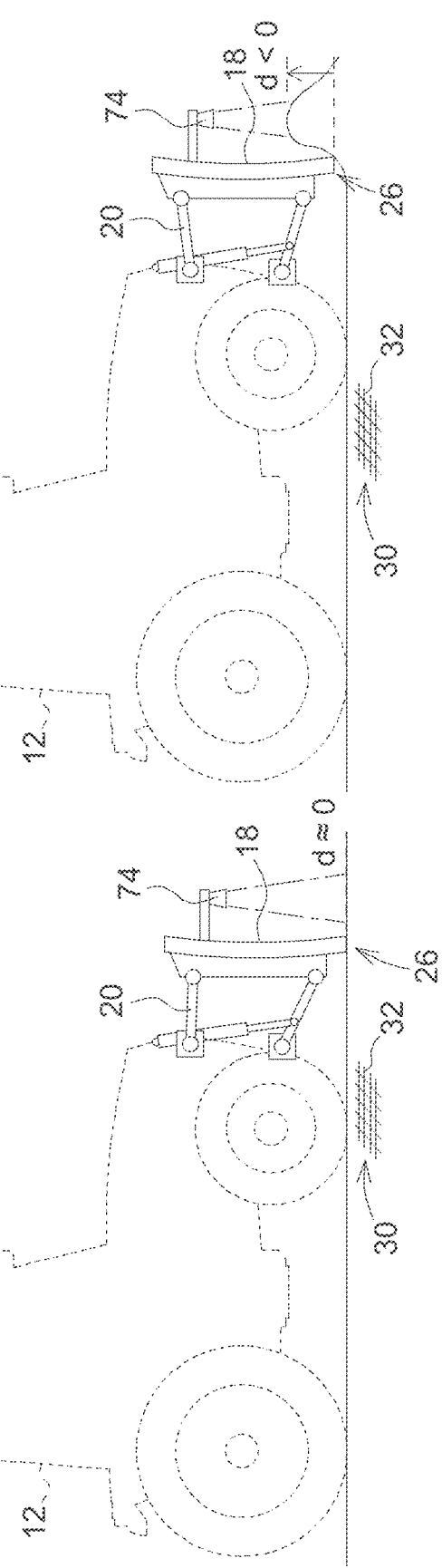

METHOD FOR ASSISTING A DISTRIBUTION PROCESS BY MEANS OF A DISTRIBUTION TOOL ON A UTILITY VEHICLE

CROSS-REFERENCE TO RELATED APPLICATIONS

This application claims priority to German Patent Application No. 102023129673.6, filed Oct. 27, 2023, which is hereby incorporated by reference.

FIELD OF THE DISCLOSURE

The disclosure relates to a method for assisting a distribution process by means of a distribution tool attached to a utility vehicle.

BACKGROUND

Silage is a type of fodder which is produced from green foliage plants which are stored in a silo. Some farmers deposit the silage in large heaps on the ground and to drive over the silage with a tractor to force out the air and then to cover it with plastic sheeting. Other farmers unload the silage in bunker silos with a base and walls made of concrete or other materials. In this case, the compacting and sealing are also carried out by plastic sheeting. The packing density of the fodder influences the quality of the silage obtained.

SUMMARY

The disclosure relates to a method for assisting a distribution process by means of a distribution tool attached to a utility vehicle, in which method the distribution tool has a lower edge, the distance of which from an underlying surface being driven on, for the purpose of specifying a layer thickness of a material being distributed to be achieved during the distribution process, can be adjusted by changing a lifting position of the distribution tool.

Methods of this kind are used, amongst other things, in road construction machines designed as graders or bulldozers, in which tracking of the lifting position of a pusher blade, the tracking being dependent on the current position, is performed to the effect that a desired surface contour of a road substructure including bulk material to be leveled is achieved. Here, tracking is automated on the basis of position information provided by a GPS navigation system. Similar applications are known from the agricultural sector, for example when creating a bunker silo or silage clamp including crop to be ensiled, for which purpose the crop is distributed layer by layer by means of a pusher blade attached to a front hitch of an agricultural tractor and compressed under the contact pressure of the tractor wheels or a pulled roller. The crop to be ensiled is typically grass, alfalfa or corn.

Owing to the exclusively position-related control of the lifting position, the actually achieved layer structure or surface profile is not taken into account in the known methods. Therefore, control of the correct distribution additionally has to be carried out by inspection, but this is restricted to a greater or lesser extent specifically in the immediate vicinity of the utility vehicle used to carry out the distribution process by vehicle parts located in the area to be viewed. Regardless of the respective area of application, production of a uniform layer structure or surface profile therefore requires drivers with a great deal of experience.

In view of this, the object of the present disclosure is to specify a method of the type mentioned at the outset such that, when carrying out a distribution process by means of a distribution tool attached to a utility vehicle, it is easier for a driver to produce a uniform layer structure or surface profile of the material being distributed.

This object is achieved by a method having the features of one or more of the embodiments described herein.

In the method for assisting a distribution process by means of a distribution tool attached to a utility vehicle, the distribution tool has a lower edge, the distance of which from an underlying surface being driven on, for the purpose of specifying a layer thickness of a material being distributed to be achieved during the distribution process, can be adjusted by changing a lifting position of the distribution tool. A distance between the lower edge and a surface region of the material being distributed, the surface region being upstream or downstream of the lower edge with respect to the forward direction of travel, is determined by a control unit by means of a sensor device attached to the distribution tool and is used as a basis for adjusting in a partially or fully automated manner the lifting position of the distribution tool in accordance with a surface profile or layer thickness profile of the material being distributed to be achieved, where, in the event of the distance determined by sensor having a value of less than zero and at the same time the current direction of travel of the utility vehicle coinciding with the position of the surface region with respect to the lower edge of the distribution tool detected by means of the sensor device, alternatively a distance from the surface of the material being distributed, the distance being estimated from the position of the lower edge resulting from the current lifting position of the distribution tool, is used by the control unit for adjusting in a partially or fully automated manner the lifting position of the distribution tool.

Such a situation arises when the material being distributed is pushed by means of the distribution tool during distribution, so that the material being distributed accumulates in an undefined manner along the lower edge of the distribution tool in the detection region of the sensor device and the distance determined by sensor no longer allows a statement to be made about the surface profile of the material being distributed produced by means of the distribution tool. On the side of the distribution tool facing away from the direction of travel of the utility vehicle, a profile corresponding to the current position of the lower edge is however impressed on the surface of the material being distributed. This circumstance can be used to derive or estimate the distance between the lower edge and the surface region of the material being distributed, the surface region being upstream or downstream of the lower edge with respect to the forward direction of travel, with sufficient accuracy from the current lifting position of the distribution tool.

This procedure makes it unnecessary to provide sensor devices for redundant distance measurement on both sides of the distribution tool. In other words, the use of just one individual sensor device either on the front or rear side of the loading tool, in each case in relation to the forward direction of travel of the utility vehicle, is sufficient, this allowing cost-saving implementation of the method according to the disclosure. The distance information thus obtained forms the basis for adjusting the lifting position of the distribution tool in a partially or fully automated manner, with the objective of making it easier for the driver to produce a uniform layer structure or surface profile of the material being distributed.

In the present case, the term "automated" adjustment of the lifting position is understood to mean actuation of an actuating device used for changing the lifting position of the distribution tool which is completely independent of intervention by the driver, with only the maneuvering of the utility vehicle still being the responsibility of the driver, whereas in the case of "partially automated" adjustment, visual output of instructions to the driver may be provided, these instructions instructing the driver to manually actuate the actuating device in a manner suitable for achieving uniform layer thicknesses.

In order to change the lifting position of the distribution tool, an actuating device designed as a hydraulic lifting mechanism is used for example, the actuating device being a constituent part of a front hitch which is provided on an agricultural tractor and to which, in turn, a distribution tool designed as a pusher blade is attached. This is used for example to create a bunker silo or silage clamp including crop to be ensiled, for which purpose the crop is distributed layer by layer by means of a pusher blade attached to the front hitch of the agricultural tractor and compressed under the contact pressure of the tractor wheels or a pulled roller. The crop to be ensiled is typically grass, alfalfa or corn.

The current lifting position of the front hitch and thus of the pusher blade can be derived, amongst other things, from the respective actuating state of the hydraulic lifting mechanism.

In addition, instead of an agricultural tractor, the utility vehicle may also equally be a corresponding road construction machine, such as a grader or a bulldozer for example. It is also conceivable that the distribution tool is not formed by a pusher blade, but rather by a loading scoop or the like. The term "lower edge" should be interpreted broadly here; it does not necessarily have to be stationary, but rather can also be located on a rotating segment of a tiller or the like.

The sensor device is, for example, a radar or ultrasonic sensor which is attached to the distribution tool and is connected to the control unit via a CAN data bus.

Advantageous developments of the method according to the disclosure can be found in the one or more of the embodiments described herein.

In the event that the distance determined by sensor has a value greater than zero, the control unit can conclude that the lower edge of the distribution tool is not in engagement with the material being distributed, and consequently the distribution tool is no longer in contact with the material being distributed on account of surface unevenness or significant uneven distribution of the material being distributed. This knowledge can be used, for example, to output driver information via a user interface, which is connected to the control unit, to the effect that the distribution process is not being executed uniformly and therefore targeted subsequent work by supplying material to be distributed is required.

Furthermore, it is possible that the value for the distance respectively used as a basis for adjusting in a partially or fully automated manner the lifting position of the distribution tool is located by combination with information provided by a navigation system with respect to the current position of the utility vehicle and is recorded in a memory unit along a route traveled by the utility vehicle while carrying out the distribution process. In other words, the layer thicknesses (already) applied are cartographically documented, which allows improved planning of subsequent distribution processes for achieving a desired layer structure.

In order to be able to centrally access the cartographic documentation relating to the layer thicknesses, for example for the purposes of work preparation or planning, the memory unit may be a data cloud which forms a data-exchange connection with the control unit via a wireless interface. Transmission via the wireless interface can be performed, for example, by streaming to a cloud-based server.

The above and other features will become apparent from the following detailed description and accompanying drawings.

BRIEF DESCRIPTION OF THE DRAWINGS

The method according to the disclosure for assisting a distribution process will be explained in more detail below with reference to the appended drawings. Components which correspond or are comparable with regard to their function are identified by the same reference signs in the drawings, in which:

FIGS. 3 to 6 show different operating situations of a distribution tool, designed as a pusher blade, when creating a bunker silo.

DETAILED DESCRIPTION

The embodiments or implementations disclosed in the above drawings and the following detailed description are not intended to be exhaustive or to limit the present disclosure to these embodiments or implementations.

Figure 1:
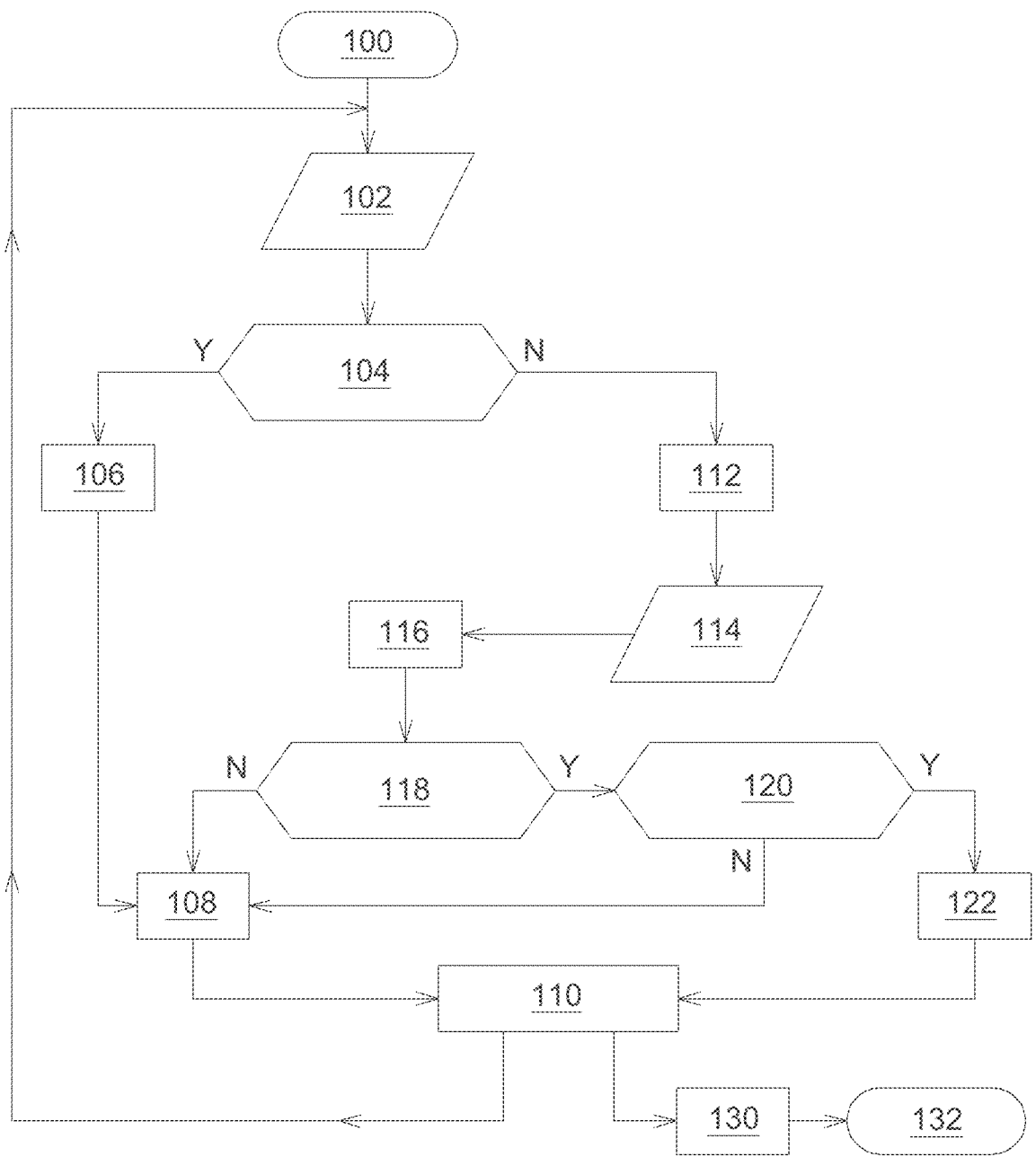
FIG. 1 shows an exemplary embodiment, illustrated as a flowchart, of the method according to the disclosure for assisting a distribution process by means of a distribution tool attached to a utility vehicle.
Figure 2:
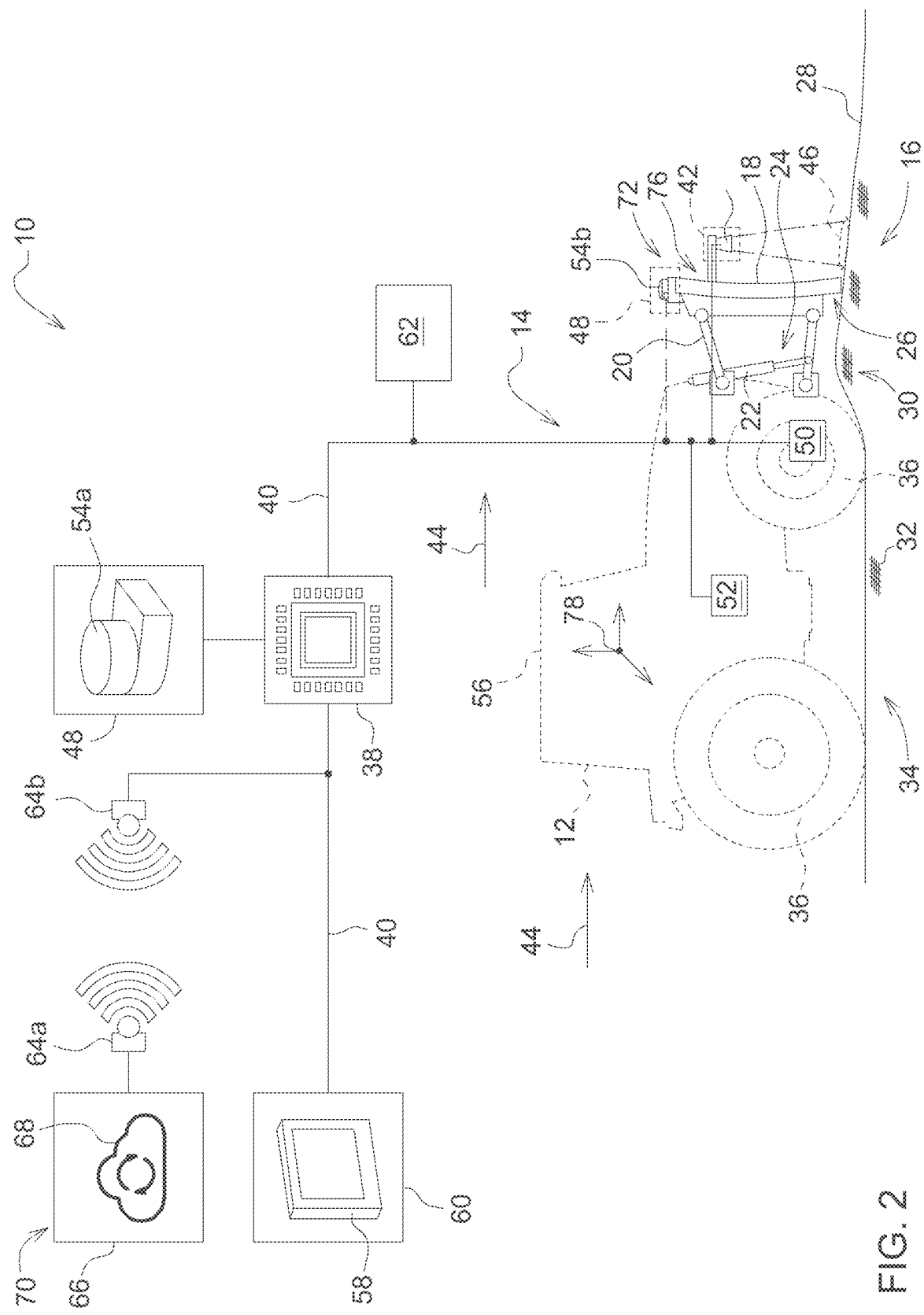
FIG. 2 shows a utility vehicle, designed as an agricultural tractor, with an arrangement for carrying out the method according to the disclosure illustrated in FIG. 1.

FIG. 1 shows an exemplary embodiment, illustrated as a flowchart, of the method according to the disclosure for assisting a distribution process by means of a distribution tool attached to a utility vehicle, where the method will be described in more detail below with reference to the arrangement according to FIG. 2 provided for carrying it out.

Proceeding from FIG. 2, the arrangement 10 is a constituent part of a utility vehicle 14, designed as an agricultural tractor 12, with a distribution tool 16 arranged on it, where the distribution tool 16 is, for example, a pusher blade 18, which is attached as a removable attachment to a front hitch 20 of the agricultural tractor 12, where the front hitch 20 has an actuating device 24, designed as a hydraulic lifting mechanism 22, for changing the lifting position of the pusher blade 18 or a lower edge 26 formed on it, so that the distance of the lower edge 26 from a underlying surface 28 being driven on, for the purpose of specifying a layer thickness of a material 30 being distributed to be achieved during the distribution process, can be adjusted by changing a lifting position of the pusher blade 18.

In the present case, the material 30 being distributed is a crop 32 to be ensiled, where the crop 32 is distributed layer by layer by means of the pusher blade 18 for creating a bunker silo or silage clamp 34 and compressed under the contact pressure of the tractor wheels 36 or a pulled roller (not shown) in accordance with the illustrations in FIGS. 3 to 6. The crop 32 to be ensiled is grass, alfalfa or corn.

Furthermore, the arrangement 10 comprises a microprocessor-controlled control unit 38 (e.g., a controller including a processor and memory), to which information is transmitted, via a CAN data bus 40, from a sensor device 42 for detecting a distance d between the lower edge 26 and a surface region 46 of the material 30 being distributed, the surface region being upstream of the lower edge 26 with respect to the forward direction of travel 44, a navigation system 48 for determining the current position of the agricultural tractor 12, a lifting mechanism controller 52, which determines the current lifting position of the front hitch 20 and thus of the pusher blade 18 from the respective actuating state of the hydraulic lifting mechanism 22, and a vehicle controller 50, which delivers information relating to the current direction of travel of the agricultural tractor 12. Here, a GPS receiving device 54a, 54b, which is included in the navigation system 48, is either arranged in the roof region 56 of the agricultural tractor 12 or else is attached to the pusher blade 18 in spatial proximity to the sensor device 42.

In addition, the control unit 38 communicates with a user interface 60 designed as a touch-sensitive display 58, with an internal memory unit 62, and, via a wireless interface 62a, 62b, with an external memory unit 66 in the form of a data cloud 68. More specifically, transmission is performed via the wireless interface 62a, 62b by streaming to a cloud-based server 70.

The sensor device 42 is a radar or ultrasonic sensor 74 mounted in an upper region 72 of the pusher blade 18. In the present case, the agricultural tractor 12 is located on a front side 76 of the pusher blade 18 in relation to the forward direction of travel 44 of the agricultural tractor. However, it should be mentioned that, in a departure from the above, attachment to a rear side of the pusher blade 18 may be provided in order to determine a corresponding distance between the lower edge 26 of the pusher blade 18 and a surface region of the material 30 being distributed, the surface region being downstream of the lower edge 26 with respect to the forward direction of travel 44. In this respect, the site at which the sensor device 42 is attached can be selected in accordance with the structural conditions of the respective distribution tool 16.

The method carried out by the control unit 38 and stored as a corresponding program code in the internal memory unit 62 is started in a start step 100 by the operator by calling up the corresponding assistance function via the user interface 60, after which, in a first main step 102, the distance d between the lower edge 26 and the surface region 46 of the material 30 being distributed, the surface region being upstream of the lower edge 26 with respect to the forward direction of travel 44, is determined by the control unit 38 by means of the sensor device 42 attached to the pusher blade 18. At the same time, in the first main step 102, a distance d' from the surface of the material 30 being distributed is estimated from the position of the lower edge 26 resulting from the current lifting position of the pusher blade 18.

In a subsequent second main step 104, the control unit 38 checks whether the distance d determined by sensor in the first main step 102 has a value greater than zero. If this is the case, the control unit 38 concludes in a third main step 106 that the lower edge 26 of the pusher blade 18 is not in engagement with the material 30 being distributed, and consequently the pusher blade 18 is no longer in contact with the material being distributed on account of surface unevenness or significant uneven distribution of the material 30 being distributed. This operating situation of the agricultural tractor 12 is illustrated in FIG. 3. In such a case, the distance d determined by sensor in the first main step 102 is selected in a fourth main step 108 to be passed on to a fifth main step 110, in which this distance is the basis for partially or fully automated adjustment of the lifting position of the pusher blade 18 in accordance with a surface profile or layer thickness profile of the material 30 being distributed to be achieved. At the same time, driver information is output via the display 58 of the user interface 60, which is connected to the control unit 38, to the effect that the distribution process is not being executed uniformly on account of the lack of contact between the lower edge 26 of the pusher blade 18 and the material 30 being distributed and therefore targeted subsequent work by supplying material 30 to be distributed is required.

The method then returns to the first main step 102 in order to be run through again.

In the present case, the term "automated" adjustment of the lifting position is understood to mean actuation of the actuating device 24 formed by the hydraulic lifting mechanism 22, which is completely independent of intervention by the driver, with only the maneuvering of the agricultural tractor 12 still being the responsibility of the driver, whereas in the case of "partially automated" adjustment, visual output of instructions to the driver is provided via the display 58 of the user interface 60, these instructions instructing the driver to manually actuate the hydraulic lifting mechanism 22 in a manner suitable for achieving uniform layer thicknesses.

If, on the other hand, in the second main step 104, the value of the distance d determined by sensor is not greater than zero, then, in a sixth main step 112, the control unit 38 concludes that the lower edge 26 of the pusher blade 18 is in engagement with the material 30 being distributed. Following this, in a seventh main step 114, the distance d determined by sensor and the estimated distance d' together with information provided by the vehicle controller 50 and relating to the current direction of travel of the agricultural tractor 12 is passed on to an eighth main step 116, in which this information is evaluated in respect of whether the current direction of travel of the agricultural tractor 12 coincides with the position of the surface region 46 detected by means of the sensor device 42 in relation to the lower edge 26 of the pusher blade 18.

If it is established in a ninth main step 118 that this does not apply in accordance with the operating situation of the agricultural tractor 12 shown in FIG. 4, the distance d determined by sensor in the first main step 102 is also selected here in the fourth main step 108 to be passed on to the fifth main step 110, in which this distance forms the basis for adjusting in a partially or fully automated manner the lifting position of the pusher blade 18 in accordance with the surface profile or layer thickness profile of the material 30 being distributed to be achieved. In addition, the control unit 38, via the display 58 of the user interface 60, causes output of driver information to the effect that the lower edge 26 of the pusher blade 18 is in engagement with the material 30 being distributed.

Both measures are also provided in the event that, in the ninth main step 118, the current direction of travel of the agricultural tractor 12 runs opposite to the position of the surface region 46 detected by means of the sensor device 18 in relation to the lower edge 26 of the pusher blade 42 and, in a tenth main step 120, it is also identified that the value of the distance d determined by sensor in the first main step 102 is equal to zero. This corresponds to the operating situation of the agricultural tractor 12 illustrated in FIG. 5.

If, however, in the tenth main step 120 in accordance with the operating situation of the agricultural tractor 12 shown in FIG. 6, the value of the distance d determined by sensor in the first main step 102 is less than zero, the distance d' estimated in the first main step 102 is selected by the control unit 38 in an eleventh main step 122 to be passed on to the fifth main step 110 in order to use this distance instead of the distance d determined by sensor and thus alternatively for the purposes of adjusting in a partially or fully automated manner the lifting position of the pusher blade 18 in accordance with the surface profile or layer thickness profile of the material 30 being distributed to be achieved.

Such a situation arises when the material 30 being distributed is pushed by means of the pusher blade 18 during distribution, so that the material being distributed accumulates in an undefined manner along the lower edge 26 of the pusher blade 18 in the detection region of the sensor device 42 and the distance d determined by sensor no longer allows a statement to be made about the surface profile of the material 30 being distributed produced by means of the pusher blade 18. On the side of the pusher blade 18 facing away from the direction of travel of the agricultural tractor 12, a profile corresponding to the current position of the lower edge 26 is however impressed on the surface of the material 30 being distributed. In the present case, this circumstance can be used to derive or estimate the distance d' between the lower edge 26 and the surface region 46 of the material 30 being distributed, the surface region being upstream of the lower edge 26 with respect to the forward direction of travel 44, with sufficient accuracy from the current lifting position of the pusher blade 18.

Optionally, a first secondary step 130, which follows the fifth main step 110, is present, in which first secondary step the value of the distance d, d' which is respectively used as a basis for adjusting in a partially or fully automated manner the lifting position of the pusher blade 18 is located by the control unit 38 by combination with the information provided by the navigation system 48 relating to the current position of the agricultural tractor 12 given by a reference point 78 fixed on the tractor and is transmitted, in a second secondary step 132, via the wireless interface 62a, 62b by streaming to the cloud-based server 70. For this purpose, the control unit 38 executes spatial transformation from the respective attachment position of the GPS receiving device 54a, 54b to the reference point 78 fixed on the tractor. As a result, the layer thicknesses (already) applied are cartographically documented in this way, which allows improved planning of subsequent distribution processes for achieving a desired layer structure.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the drawings, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A method for assisting a distribution process by a distribution tool attached to a utility vehicle, comprising:
   adjusting via a control unit a position of a lower edge of the distribution tool by changing a lifting position of the distribution tool for the purpose of specifying a layer thickness of a material being distributed to be achieved during the distribution process;
   determining via the control unit by a sensor attached to the distribution tool a first distance between the lower edge and a surface region of the material being distributed upstream of the lower edge with respect to a travel direction of the utility vehicle;
   utilizing via the control unit the first distance as a basis for adjusting in at least a partially automated manner the lifting position of the distribution tool in accordance with the layer thickness of the material being distributed to be achieved when the first distance has a value greater than or equal to zero;
   estimating via the control unit a second distance from the lower edge of the distribution tool to the surface region of the material based on the position of the lower edge resulting from the lifting position of the distribution tool; and
   utilizing via the control unit the second distance for adjusting in at least a partially automated manner the lifting position of the distribution tool when the first distance has a value of less than zero and the surface region is upstream of the travel direction of the utility vehicle.

2. The method of claim 1, further comprising:
   determining via the control unit that the lower edge of the distribution tool is not in engagement with the material being distributed when the first distance determined by the sensor has a value of greater than zero.

3. The method of claim 1, further comprising:
   recording in a memory unit the value of the first distance in combination with a position of the utility vehicle provided by a navigation system; and
   recording in the memory unit the value of second first distance in combination with the position of the utility vehicle provided by the navigation system.

4. The method of claim 3, wherein the memory unit is a data cloud which forms a data-exchange connection with the control unit via a wireless interface.

5. A system for assisting a distribution process by a distribution tool attached to a utility vehicle, comprising:
a control unit configured to:
- adjust a position of a lower edge of the distribution tool by changing a lifting position of the distribution tool for the purpose of specifying a layer thickness of a material being distributed to be achieved during the distribution process;
- determine by a sensor attached to the distribution tool a first distance between the lower edge and a surface region of the material being distributed upstream of the lower edge with respect to a travel direction of the utility vehicle;
- utilize the first distance as a basis for adjusting in at least a partially automated manner the lifting position of the distribution tool in accordance with the layer thickness of the material being distributed to be achieved when the first distance has a value greater than or equal to zero;
- estimate a second distance from the lower edge of the distribution tool to the surface region of the material based on the position of the lower edge resulting from the lifting position of the distribution tool; and
- utilize the second distance for adjusting in at least a partially automated manner the lifting position of the distribution tool when the first distance has a value of less than zero and the surface region is upstream of the travel direction of the utility vehicle.

6. The system of claim 5, wherein the control unit is configured to determine that the lower edge of the distribution tool is not in engagement with the material being distributed when the first distance determined by the sensor has a value of greater than zero.

7. The system of claim 5, wherein the control unit is configured to record in a memory unit the value of the first distance in combination with a position of the utility vehicle provided by a navigation system, and record in the memory unit the value of second first distance in combination with the position of the utility vehicle provided by the navigation system.

8. The system of claim 7, wherein the memory unit is a data cloud which forms a data-exchange connection with the control unit via a wireless interface.

* * * * *